US007865398B2

(12) United States Patent
Schøn

(10) Patent No.: US 7,865,398 B2
(45) Date of Patent: Jan. 4, 2011

(54) RADIO FREQUENCY IDENTIFICATION TAG ON PICKING CONTAINER AND DISPLAY OF PICKLIST TO ORDER FILLER

(75) Inventor: Bjarne Schøn, Naerum (DK)

(73) Assignee: Microsoft Corporation, Redmond, WA (US)

( * ) Notice: Subject to any disclaimer, the term of this patent is extended or adjusted under 35 U.S.C. 154(b) by 1377 days.

(21) Appl. No.: 10/675,591

(22) Filed: Sep. 30, 2003

(65) Prior Publication Data

US 2005/0071234 A1 Mar. 31, 2005

(51) Int. Cl.
*G06G 1/14* (2006.01)
*G06Q 10/00* (2006.01)
(52) U.S. Cl. .......................................... 705/22; 705/28
(58) Field of Classification Search .................. 705/22
See application file for complete search history.

(56) References Cited

U.S. PATENT DOCUMENTS

| | | | | |
|---|---|---|---|---|
| 5,565,858 A | | 10/1996 | Guthrie ................. | 340/825.35 |
| 5,640,002 A | * | 6/1997 | Ruppert et al. ......... | 235/462.46 |
| 5,730,252 A | | 3/1998 | Herbinet ................... | 186/52 |
| 6,179,206 B1 | * | 1/2001 | Matsumori .................. | 235/383 |
| 6,600,418 B2 | * | 7/2003 | Francis et al. ............ | 340/572.1 |
| 6,661,339 B2 | | 12/2003 | Muirhead ................... | 340/505 |
| 6,718,888 B2 | | 4/2004 | Muirhead ................ | 108/57.25 |
| 6,837,436 B2 | * | 1/2005 | Swartz et al. .......... | 235/472.02 |
| 6,901,304 B2 | * | 5/2005 | Swan et al. ................. | 700/115 |
| 6,943,678 B2 | | 9/2005 | Muirhead ................... | 340/505 |
| 7,020,494 B2 | * | 3/2006 | Spriestersbach et al. .... | 455/566 |
| 2002/0170961 A1 | | 11/2002 | Dickson et al. ............. | 235/383 |
| 2003/0061113 A1 | | 3/2003 | Petrovich et al. .............. | 705/26 |
| 2003/0227392 A1 | * | 12/2003 | Ebert et al. ............ | 340/825.49 |
| 2004/0069850 A1 | * | 4/2004 | De Wilde .................... | 235/385 |
| 2004/0168618 A1 | | 9/2004 | Muirhead ................ | 108/57.25 |
| 2005/0237184 A1 | | 10/2005 | Muirhead .............. | 340/539.13 |
| 2005/0241548 A1 | | 11/2005 | Muirhead .................. | 108/51.3 |

OTHER PUBLICATIONS

NPL_RFID_IEC_18000, ISO/IEC 18000, Information technology—Radio frequency identification for item management. Downloaded from Wikipedia.org on Nov. 27, 2009, 2 pages.*
EP Office Action Application No. 04 019 838.4-1238.

(Continued)

*Primary Examiner*—F. Ryan Zeender
*Assistant Examiner*—Paul Danneman
(74) *Attorney, Agent, or Firm*—Westman, Champlin & Kelly, P.A.

(57) ABSTRACT

A method of filling an order in a warehouse or store. An order is received at a product moving device, and is filled with items in the warehouse. The order is displayed as a picklist that includes data about each item, including the number of the item desired, and any special loading considerations. As items are placed on the device, an RF reader on the device detects the item, and removes the item from the picklist. If an item not on the list is loaded on the device, the system detects the item, and notifies the operator. The item must be removed, or allowed to remain, before any other items are loaded.

24 Claims, 10 Drawing Sheets

OTHER PUBLICATIONS

METRO Group, Solution Blueprint, "EPC RFID-based Inventory Management Solution Delivers Faster, Better Good Logistics", Apr. 2003.

Opusworld solutions from Microlise, "RFID Tagging Technology" Jan. 3, 12003.

Wolff, John A., IBM Global Services, "RFID tags-an intelligent bar cod replacement", 2001.

Chinese Patent Application No. 200410083116.2 Office Action dated Dec. 7, 2007.

\* cited by examiner

| ITEMS | QUANTITY | NUMBER PRESENT |
|---|---|---|
| APPLES | 12 | |
| ORANGES | 12 | |
| MILK | 2 gal | |
| CHEESE | 1 | 1 |
| EGGS | 1 dozen | |
| ABC MACARONI AND CHEESE | 4 | |
| TORTILA CHIPS | 1 | |
| STRAWBERRY ICE CREAM | 0 | 1 |
| PEAS | 2 | 1 |

STRAWBERRY ICE CREAM HAS BEEN ADDED TO YOUR CART. DO YOU WISH THE ITEM TO REMAIN?
YES   NO

TOTAL   $21.36

FIG. 7

RADIO FREQUENCY IDENTIFICATION TAG ON PICKING CONTAINER AND DISPLAY OF PICKLIST TO ORDER FILLER

BACKGROUND OF THE INVENTION

The present invention relates to filling an order in a warehouse or other inventory sensitive area. In particular, the present invention relates to a radio frequency identification system used in a warehouse to register items as they are placed on a pallet and to reflect those items on the order.

In a typical warehouse, orders are constantly being filled in response to new orders being generated. As employees fill an order in the warehouse they must move around the warehouse and obtain each item on the order. Furthermore, the employees must know where each item is in the warehouse. The employees load each item of the order on a pallet or other device, and then deduct the item from the order manually. This manual loading and deduction from an order can allow for errors to occur in loading and filling the order. Furthermore, employees can claim to have loaded an item when in fact it has not been loaded. To combat this problem many warehouses have moved to using radio frequency tags or bar codes to track the movement of items in the warehouse.

With a wide range of capabilities, RF (radio frequency) tags are a growing area in tracking technology. RF identification (RFID) is used for theft control tags, production tracking tags, asset management, product tracking, and other uses. Unlike barcodes, RF tags can be read through almost 2 inches (5 cm) of packaging and are unaffected by moisture and heat making them highly effective in manufacturing and distribution environments. RF tags enable automatic identification with no physical contact. Depending on the specific type of RF tag employed, the read range extends from a few inches to hundreds of feet.

In general terms, RFID is a means of identifying a person or object using a radio frequency transmission, typically 125 kHz, 13.56 MHz or 800-900 MHz. RFID has been extensively used in applications such as toll collection, access control, ticketing, and car immobilization devices (also called immobilizers). In recent years, the technology has received increased attention due to a confluence of actions including technology advancement, heightened security concerns, supply chain automation, and a continuing emphasis on cost control within industrial systems.

The AIDC (Automatic Identification Data Capture) industry is moving rapidly towards the use of RFID in a number of high-value and high-volume market segments. The primary benefit of RFID tags over barcodes is their ease of use and reliability. RFID tags can be read or written at distances up to several feet, while in motion, in any orientation, regardless of dirt or smudges, and through intervening objects. Perhaps most significant is the fact that many RFID tags can be read at once automatically, while barcodes have to be scanned manually, one by one.

An RF tag will only communicate when it is in range of a read/write device (a transceiver, a transmitter/receiver, or a reader) and can be accessed at anytime. RF tags are durable and have a long life span, no battery requirement, and large data memory capacity. RF Tags are available in a variety of different shapes and sizes. Due to their versatility, they can be placed in many different types of casing such as plastic cards, stickers, wristbands, coins, labels, etc. Examples include animal tracking tags, inserted beneath the skin. These tags can be as small as a pencil lead in diameter and one-half inch in length. RF tags can be screw-shaped inserted to identify trees or wooden items, or credit-card shaped for use in access applications. Anti-theft hard plastic tags attached to merchandise in stores can be supplemented as RF tags. In addition, heavy-duty 5-by 4-by 2-inch rectangular transponders can be used to track intermodal containers or heavy machinery, trucks, and railroad cars for maintenance and tracking applications.

In construction an RFID tag has a microchip attached to an antenna. RFID tags are developed using a frequency according to the needs of the system including read range and the environment in which the tag will be read. Tags are either active or passive.

Active RF tags are powered by an internal battery and are typically read/write devices. Active RF tags are more expensive and larger than passive RF tags. However, they are also more powerful and have a greater read range. Passive RF tags are powered by the field generated by the reader. Passive tags are typically much lighter than active tags, less expensive, and offer a virtually unlimited operational lifetime. However they have shorter read ranges and require a higher-powered reader than active tags.

An RFID reader, usually connected to a Personal Computer, serves the same purpose as a barcode scanner. It can also be battery-powered to allow mobile transactions with RFID tags. The RFID reader handles the communication between the Information System and the RFID tag.

An RFID antenna connected to the RFID reader, can be of various sizes and structures, depending on the communication distance required for a given system's performance. The antenna activates the RFID tag and transfers data by emitting wireless pulses.

An RFID station is made up of an RFID reader and an antenna. It can read information stored into the RFID tag and also update the RFID tag with new information. It generally holds application software specifically designed for the required task. RFID stations may be mounted in arrays around transfer points in industrial processes to automatically track assets as they are moving through the process.

However, the use of RF tags in warehouses has not solved the problems of ensuring that the proper items have been loaded on a, pallet to fill an order, or determine whether extra items have been placed on the pallet.

SUMMARY OF THE INVENTION

The present invention addresses at least some of the needs of warehouse managers to know what items are going out of the warehouse in specific orders. In contrast to previous systems, the present invention uses the RF tags in combination with an order or picklist to fill an order.

In one embodiment, when an order is placed it is transmitted to an RF tag on a pallet from a central computer or other source. This transmission includes a variety of data related to the specific order to be filled. When a forklift engages the pallet, the RF readers on the forklift and the pallet communicate with each other. The RF tag on the pallet transmits to the forklift the order information as a picklist.

The picklist is then displayed to the operator of the forklift on a display device. The display device provides the operator with information related to each item in the picklist. This information includes the name of the item, the quantity of the item desired, and the location of the item. Further the operator is presented with the order number and the pallet number. The system of the present invention can then instruct the operator to proceed to a specific item on the picklist, or the operator can move to the location of an item on the picklist.

When the operator arrives at the location of an item on the picklist, the item is loaded on the pallet. Once on the pallet the RF reader for the pallet identifies the item and logs the item into the pallet's inventory. At the same time the forklift's RF reader reads the RF tag of the item, and identifies the item in the picklist. The display device on the forklift then updates the list to reflect the item present. In one embodiment the number remaining and the number present fields on the display device are updated to reflect the presence of the item on the pallet.

If the item placed on the pallet was not on the picklist, the display device can alert the operator that the item was not on the picklist. Depending on the configuration of the system, the forklift will not be able to move until the item is removed, or an override is used. If the item remains on the forklift, a notation is made to the system and the RF tag that an extra item was placed on the order, to assist in tracking any discrepancies in the order.

Once all of the items from the picklist are loaded on the pallet, the display screen can direct the operator to a packing area. At this point, in one embodiment, the RF tag for the pallet receives data related to the forklift that handled the order. This information assists in tracking the history of the order. Once the order is packed it is ready for transport. At this point the RF tag for the pallet, can transmit information related to the destination of the order, without transmitting the contents of the order to a forklift. However, if there is a desire to know the contents of the pallet, the inventory of the RF tag can be queried and the information displayed.

Other embodiments of the present invention extend beyond the warehouse environment. In one embodiment the present invention is used in a grocery store setting. The shopper generates a list of items needed from the grocery store, and brings the list to the store. The list is transmitted from the shopper to a shopping cart or hand basket based on the size of the list. As the shopper adds items to the cart, the items are detected and deducted from the shopping list. If an item not on the list is added to the cart, the shopper is notified of the item, and asked if they desire the item to remain. The shopper can also view the total price of the items in the cart. When the shopper is ready to check out, the RF tag for the cart is read by the check out stand, and a total price is presented to the shopper without the need to scan all of the items. In an alternative embodiment, the shopper can preregister a credit card to the account and charge the entire bill automatically.

BRIEF DESCRIPTION OF THE DRAWINGS

FIG. 7 is a diagrammatic illustration of a display screen, according to an alternative embodiment.

DETAILED DESCRIPTION OF ILLUSTRATIVE EMBODIMENTS

Figure 1:
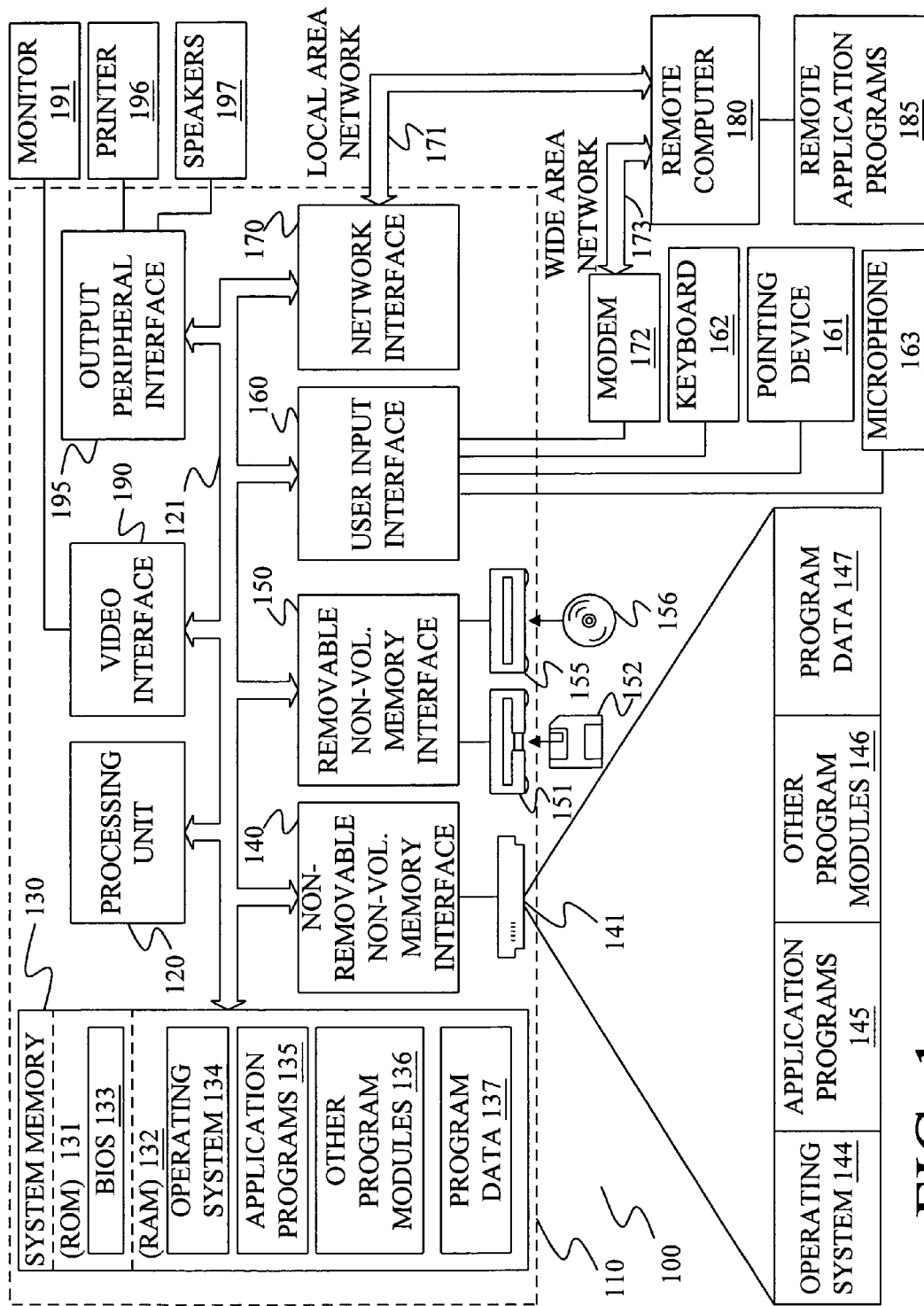
FIG. 1 is a block diagram of one exemplary environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
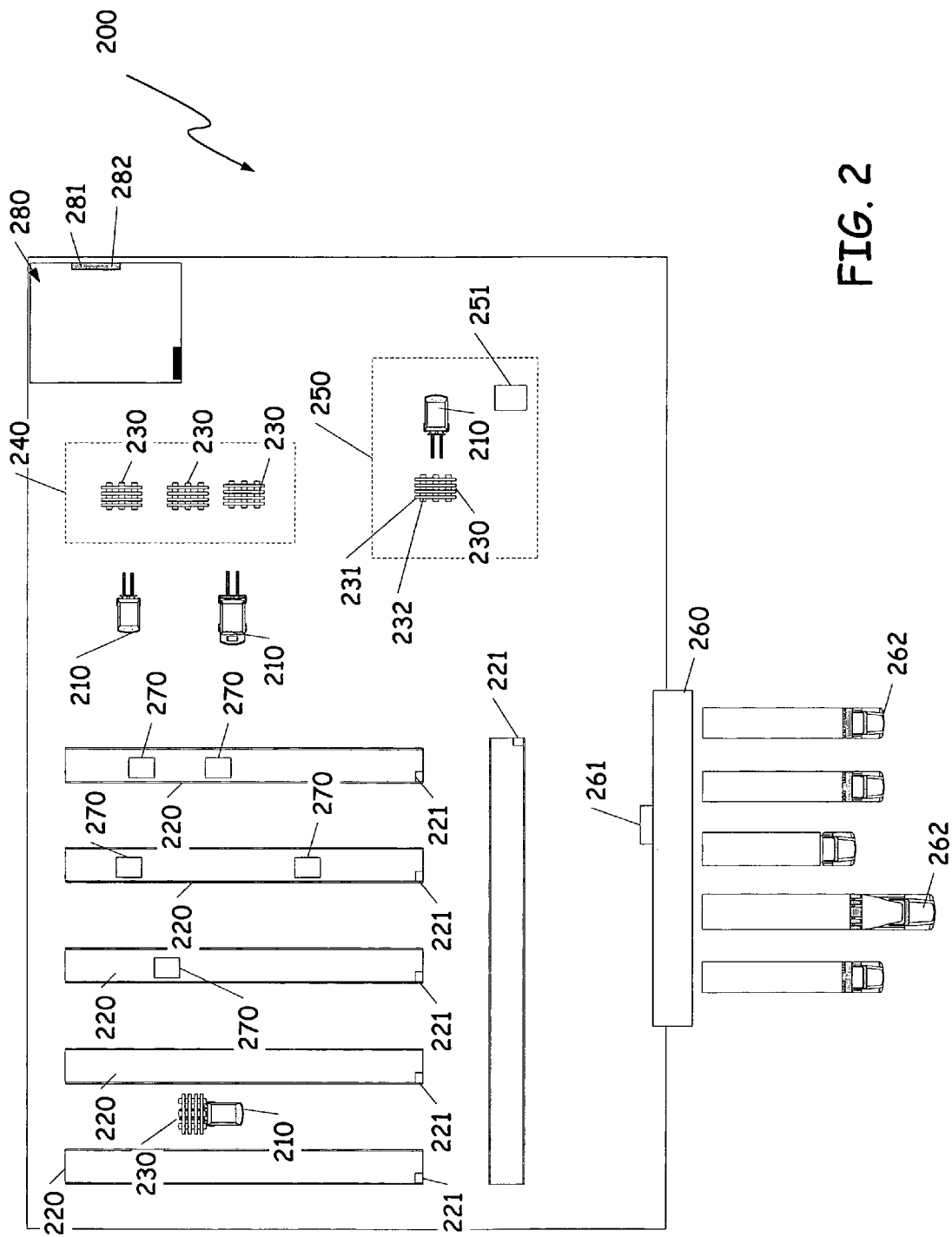
FIG. 2 is an overview diagram of a warehouse in which the present invention can be used.

FIG. 2 is an overview diagram of warehouse 200 in which the order filling system of the present invention can be implemented. Warehouse 200 includes a plurality of container-moving units 210, storage units 220, pallets 230, a pallet pick up area 240, a pallet packing area 250 and a loading dock 260.

In one embodiment storage units 220 are storage shelves typically used in a warehouse to store products. However, other storage methods can be used in warehouse 200. Storage shelves 220 are arranged around the warehouse 200 in any manner desired by the warehouse operator. Generally, the storage shelves 220 are arranged in such a way as to maximize the available space in the warehouse 200. A typical warehouse for a distributor or a wholesaler has tens if not hundreds of storage shelves 220 arranged around the warehouse 200. For purposes of simplicity only, FIG. 2 illustrates six storage shelves 220. However, any number of storage shelves 220 can be present in warehouse 200. Furthermore, depending on the needs of the warehouse, a combination of storage shelves 220 and any other storage method can be used in warehouse 200.

Storage shelves 220 also include at least one radio frequency (RF) reader 221. RF reader is configured to allow communication between an RF tag for items 270 stored on storage shelves 220 and the order filling system of the present invention. RF readers 221 are arranged on shelves 220 such that they are able to determine the location of any RF tag that is located on the shelf 220.

Storage shelves 220 are arranged in the warehouse 200 such that a forklift 210 is able to easily maneuver between shelves 220. The spacing between individual shelves 220 allows for an operator of a forklift 210 to easily access any items that are stored on shelves 220.

Product moving devices 210 are used in the warehouse 200 to move various items stored in the warehouse 200 within the warehouse 200. In one embodiment, these devices 210 are forklifts. However, any other device capable of moving items around the warehouse can be used, for example a hand truck, a person, a dolly, etc. In the embodiment illustrated in FIG. 2, forklift 210 is equipped with a user interface 211 that provides instructions to the operator of the forklift 210 that show what items need to be obtained in the warehouse 200.

Pallets 230 are provided in the warehouse to ease in the transportation and gathering of specific orders that have been chosen by the warehouse operator. In one embodiment pallets 230 are wooden pallets that are designed to be picked up and moved around by forklift 210. However, other devices can be used to hold items in the warehouse, such as boxes, crates, containers, LD-1, LD-3 and LD-7. Attached to each pallet 230 is an RF tag 231. RF tag 231 stores data related to the items that are to be loaded on pallet 230. Further, pallet 230 also contains a RF reader 232 that is capable of receiving and transmitting RF signals from RF tags of the items that are placed on pallet 230. RF reader 232 and RF tag 231 can be integrated into a single unit or can be stand alone units.

Pallet pick up area 240 is an area of warehouse 200 where pallets 230 are placed prior to an order being fulfilled. Area 240 includes a transmitter 241 that allows the system of the present invention to communicate an order that is to be fulfilled to the RF tag 231 on pallet 230. As long as a pallet 280 is located in loading area 240 the pallet can be updated with a new order or have items added to the current order for the pallet. However, in other embodiments pallets can be loaded with orders at any location in the warehouse 200.

Packing area 250 is a separate area of warehouse 200 where finished orders that have been loaded on a pallet 230 are dropped prior to loading on to a truck 262 for shipment. In area 250, there is a RF reader 251 that monitors the items contained on a pallet 230. While the pallet is in packing area 250, reader 251 verifies the contents of pallet 230 and can provide an alert to a person if the contents of the pallet 230 do not match the items in the order. Furthermore, at this time, reader 251 can provide information to RF tag 231 that is useful for the delivery and transport of the contents of pallet 230. This information can include such items as delivery address, freight company, interim transit points, or any other information deemed useful to the warehouse to facilitate the ease of shipment.

Loading dock 260 is a portion of warehouse 200 that enables the loading and unloading of products from the warehouse 200. In the embodiment illustrated in FIG. 2 loading dock 260 includes a RF reader 261 that is configured to detect the passage of a pallet 230 prior to loading the pallet on a truck 262. As there can be any number of trucks 262 located at loading dock 260 the ability to track the movement of the pallet 230 into a specific truck helps ensure that the correct container is placed on the correct truck 262. While FIG. 2 illustrates a plurality of trucks 262, those skilled in the art will realize that other types of vehicle and containers can be used.

Office 280 is illustratively an area that manages, generates and transmits orders throughout the warehouse 200. Office 280 includes a computer system 281 that can be similar to computer system 100 of FIG. 1. Computer system 281 includes a software program that can generate orders and transmit the orders to specific pallets 230 in the warehouse 200. Further, computer system 281 can receive data from various RF tags in the warehouse 200, and incorporate this received data into a warehouse management program 282. The warehouse management software program 282 performs several functions in the warehouse. These functions can include inventory management, order generation/placement/fulfillment, facilities planning, or any other function that is commonly performed in a warehouse. In other embodiments of the present invention computer system 281 is provided with data needed to generate a picklist or order form at a remote computer. Any received data can be transmitted back to the remote computer.

Figure 3:
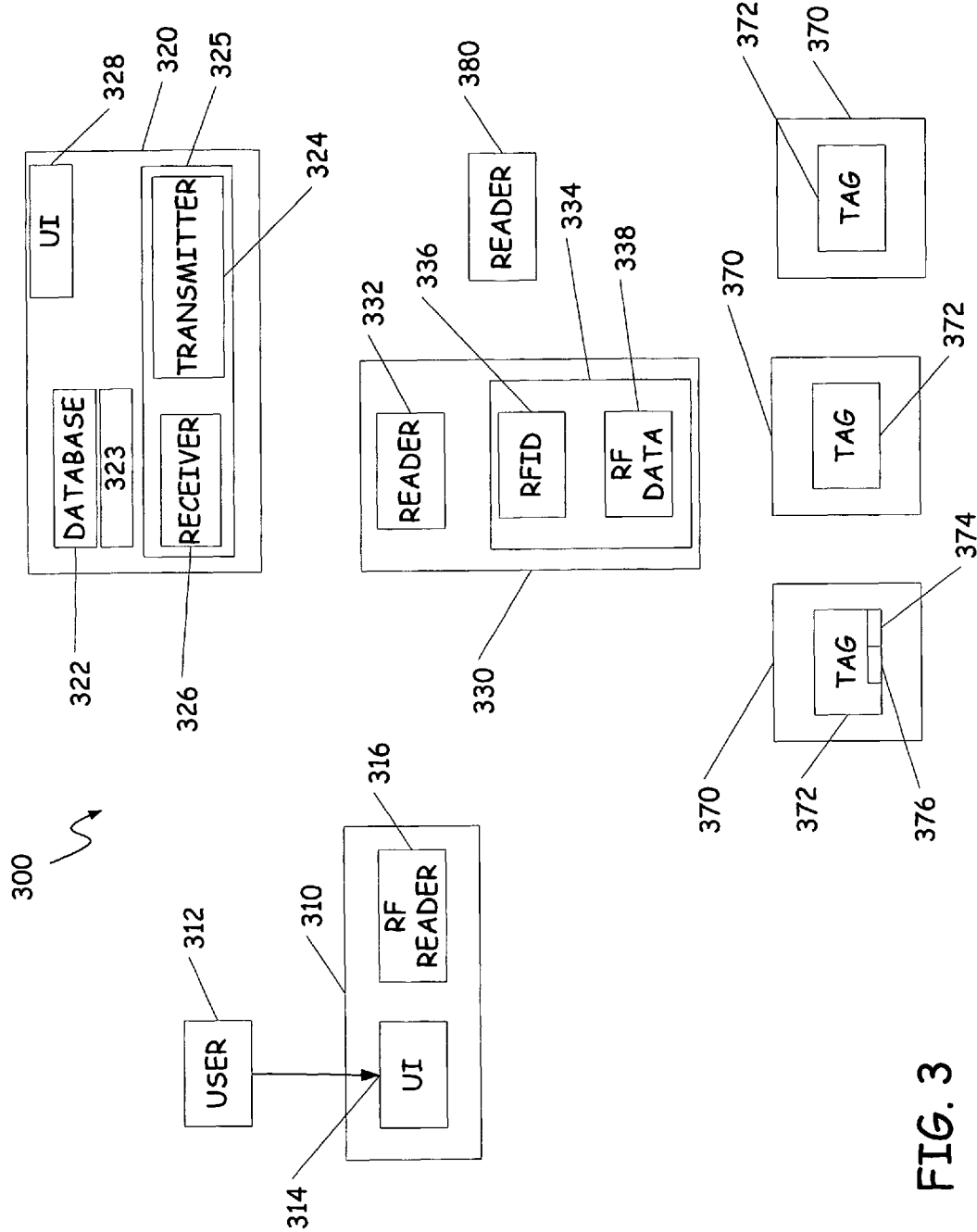
FIG. 3 is a block diagram illustrating the components of the order filling system.

FIG. 3 is a block diagram illustrating the components of the order filling system 300 according to one embodiment of the present invention order filling system 300 includes a product moving vehicle 310, a product storage device 330, a master computer system 320, and a plurality of items 370. However, other or different components can be present in order filling system 300.

Product moving vehicle 310 is similar to the forklift 210 described in FIG. 2. However, other types of vehicles can be used. For purposes of this discussion product moving vehicle will be referred to as a forklift. Forklift 310 includes a user interface 314 and a RF reader 316. Information is provided to the forklift 310 from the product storage device 330. This information is received from the product storage device 330 at the RF reader 316. Included in this information is a picklist 335 or other information that is useful to an operator 312 in filling the order indicated by the picklist 335. This information is displayed to the operator 312 through user interface 314. User interface 314 is described in greater detail with respect to FIG. 4 below.

Product storage device 330 is similar to the pallet 230 described in FIG. 2. However, product storage device 330 does not have to be a pallet, but can be any other object that is able to store or hold items for packaging or transportation. Pallet 330 includes an RF reader 332 and an RF tag 334. The RF reader 332 is configured to receive and transmit information from/to the master computer system 320, a plurality of items 370, and the forklift 310. While pallet 330 is illustrated in FIG. 3 with an RF reader 332, those skilled in the art will readily recognize that RF reader 332 can be implemented using an RF receiver and an RF transmitter.

The RF tag 334 is, in one embodiment, a small tag located on the pallet 330 in a position such that it does not interfere with the loading, unloading, or transportation of the pallet 330. For example RF tag 334 can be placed on the inside portion of a support on pallet 330. However, other arrangements of RF tag 334 are possible. The RF tag 334 includes at least a component configured to store a RF identifier (ID) 336 and a component configured to store RF data 338 for the pallet.

The RF ID 336 is a unique identifier for the pallet 330 that allows the pallet to identify itself to any other device within range of the RF tag 334. When items, such as items 370, are placed on the pallet 330, the RF reader 332 reads the information contained on an RF tag 372 associated with the specific item 370. The information received about the item is then relayed to an RF tag 334 on the pallet 330, which stores the information about the item in the RF data portion 338 of the RF tag 334. The information stored in the RF data portion 338 can include the name of the item, a description of the item, the items ID, and a weight of the item. However additional or different data can be provided. The RF reader 332 can also transmit to the RF tag 370 information about the pallet 330 onto which the item 370 is loaded. This information can include a pallet ID, and a date and time the item was added to the pallet 330. Once again additional or different data can be added to the pallet. This information can be used in tracking the history of the item 370 in the event that the item is damaged or missing from an order. However, more or less information can be provided to tags 334 and 370.

Items 370 are items that are located throughout the warehouse 200, or any other location where the present invention is implemented. Items 370 can include packages, goods, component parts or any other item typically handled by a warehouse. Each item 370 includes an RF tag 372 that is attached to the item 370, or placed inside the packaging that encloses the item 370. The RF tag 372 is similar to other RF tags discussed above. The RF tag 372 can include separate components that store information related to both the history and the contents of the item 370. These components are illustrated by reference numbers 373 and 374 respectively. This information can include a date of manufacture for the item, item description, an item weight, an item's dimensions, a lot number, and manufacturer of the item. However, other information related to the item 370 can be stored on RF tag 372.

When item 370 is moved around a warehouse, such as warehouse 200, or placed onto a pallet, such as pallet 330, information related the storage of the item 370 can be added to the RF tag 372. This information can be used when tracking the history of an item 370 as it moves from manufacturer to consumer. When items 370 are perishable or condition sensitive items, information stored on the tag 372 can include data related to the ambient conditions of the storage and transport of the item 370 such as temperature or shock. Additional data can be added to the RF tag 372 indicating the people, companies, common carriers, or agencies that handled or contacted the item 370 during its transport and storage.

RF readers 380 are readers that are located around the warehouse 200 or other location where the present invention is implemented. Generally, there are a plurality of these RF readers 380 located strategically around the warehouse, such that there is never a "dead zone" for any RF tag such as tag 372, located in the warehouse 200. The RF reader 380 allows the master computer system 320 to communicate with all of the RF tags that are located within the warehouse 200. In one embodiment each RF reader 380 is hardwired to the master computer system 320. However, other means of linking each RF reader 380 to the master computer system 320 can be used, such as a wireless connection. Further, RF reader 380 can be separated into a separate RF receiver and a separate RF transmitter.

Master computer system 320 is, in one embodiment, a computer system similar to computer system 100 described in FIG. 1. Additionally, master computer system 320 includes an RF reader 325 having an RF transmitter 324, an RF receiver 326, a database 322, and a user interface 328. However, other components can be present in master computer system 320.

The master computer system 320 allows for the management of a warehouse as well as the efficient movement of items, pallets and equipment within the warehouse 200. Database 322 contains information related to every item in the warehouse. Database 322 is in one embodiment a structured query language (SQL) database. However, other database structures can be used to store data in database 322. This data can include the location of each item, a date the item entered the warehouse, a destination of the item, and an associated order for the item. However, depending on the needs of the warehouse database 322 can contain additional or less information related to the item.

Master computer system 320 also includes a program 323 that allows the user to generate a picklist of items needed to fill an order. The picklist program accesses database 322 and is configured to group items in the database 322 together in response to a picklist being generated. An order can be generated through the use of user interface 328 or it can be transmitted to the master computer system 320 from a remote computer. The master computer system 320, through program 323, proceeds to identify items in database 322 that are needed to fill the order, and generates a picklist for the order. This picklist is then transmitted to a pallet 330 via RF transmitter 314. Once the picklist is generated the master computer system 320 can identify the pallet that is best for the order. This decision can be made based on the size of the order or any other method that can select the size or type of a pallet.

When the pallet 330 is picked up by a forklift 310, the master computer system 320 can direct the forklift 310 through the warehouse 200 in the most efficient manner to fill the order. The master computer system 320 is able to direct the forklift 310, because it can locate each item 370 and the forklift 310 in the warehouse through the RF readers 380. The master computer system 320 can also add to the database 322 information related to the movement of each pallet 330 and each item 370. This information can include when an item was added to the pallet, when the item was loaded on a truck or into a container, or any other information that is useful to the warehouse. Furthermore, the master computer system 320 can add this information to the respective RF tag for the pallet or the item.

Figure 4:
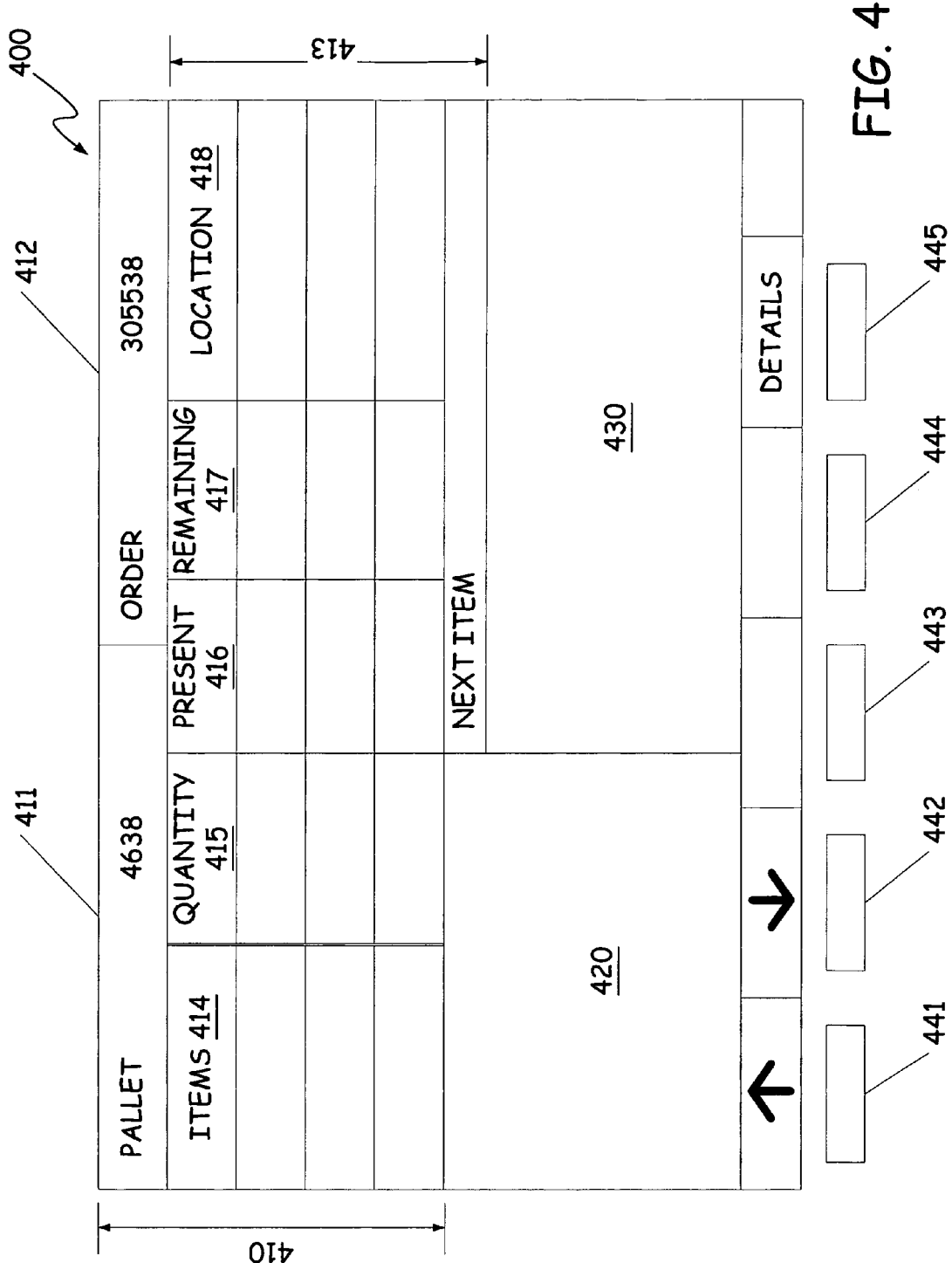
FIG. 4 is a diagrammatic illustration of a display screen.

FIG. 4 is a diagrammatic representation of a display screen 400 illustrating a picklist according to one embodiment of the present invention. In the embodiment of FIG. 4, display screen 400 is a monitor or other device capable of displaying information to a forklift operator such that the operator is able to view the items needed to fulfill an order. Display screen 400 includes an order information area 410, a location area 420, an instruction area 430, and user interface section 440.

Order information area 410 is a portion of the display screen 400 that provides the operator with information related to a specific order. When the forklift 210 loads a pallet or box on its tines the RF tag on the pallet transmits to the forklift 210 the data that is related to loading the pallet. First at 411 the pallet's ID number is displayed. This allows the operator to know which pallet is being loaded, and allows the operator to verify that this pallet is the pallet on the forklift 210. Next at 412 is an order number. This number allows the operator or other person accessing the pallet to know what order is being filled on this particular pallet. Below the pallet ID number 411 and the order number 412 is the picklist 413 that includes the items to be obtained to fill the order. Each item in the order is presented on the display screen 400 as a separate line. However, other methods of displaying the order can be used.

In the picklist section 413 the operator is presented with information about each item in the order. A description of the item is displayed in section 414. The number or quantity of the item needed for the order is displayed in the quantity section 415. The operator is able to view the quantity of the item currently present on the pallet 330 in section 416 of picklist 413. The operator is also presented with the quantity of the item remaining to complete the order in section 417. The location of the item in the warehouse is displayed to the operator in section 418. The location displayed can include the exact location of the item, or a general location i.e. a shelf number or general area of the warehouse. However, other information can be displayed in order are 410

The location area 420 of display 400 is in one embodiment a map of the warehouse 200. The map can show the location of the forklift 310 and the item 370 currently selected by the order management system 300 to place on the pallet 330. This information assists the operator in maneuvering the forklift 310 to efficiently obtain the desired items on the picklist 413. The location area 420 can also provide driving directions to the forklift 310 allowing the order to be processed in the most efficient manner. The display can include a map routing to the item using lines, or other methods of indicating a direction or path. Also, in the map display, other forklifts 210 in the warehouse can be shown so as to reduce the number of accidents, or to assist the operator in avoiding currently blocked aisles. However, other information can be displayed on location area 420.

Instruction area 430 is a portion of the display screen 400 that allows the system to provide instructions or additional information to the operator. In one embodiment these instructions can include information as to what item 370 is the next item to be loaded on the pallet 300. If there is a specific order or arrangement required for the items 370 on the pallet 330 these instructions can also be provided by the order system 300 to the user in area 430. For example, if some of the items in the order are extremely heavy, the system can instruct the operator to place these items on the bottom of the pallet 330. If the pallet is being loaded as an LD-3 aircraft pallet (or other balance sensitive pallet), then the system can instruct the operator to place heavier items in a specific area of the pallet to obtain a correct weight balance. Further, examples of instructions can include a lift warning to instruct the operator to obtain assistance prior to lifting or loading a heavy item onto the pallet 330 to avoid injury. However, those skilled in the art will readily recognize that other instructions can be provided.

User interface section 440 is provided on the display device 400 to allow the operator to view more details about a specific item on the order, or to view other options that are not shown on the screen. In one embodiment, the user interface section 440 includes a plurality of buttons 441, 442, 443, 444 and 445 that can be activated by the operator. Above the buttons 441-445 is a display portion that provides information relating to a response that is executed by the system when the corresponding button 441-445 is pressed. As illustrated in FIG. 4, buttons 441-445 can enable a cursor to move between items in the picklist 413 by pressing the up 441 or down 442 button on the display device 400. By pressing button 445 the user can view details about the selected item. When the user chooses to view a specific item, the display device 400 changes the display so that the user can view the details. When the user is finished viewing the details of the item the display screen can return to the original screen mode when the user presses the button associated with the picklist 413 screen. Alternatively, the system 300 can be programmed to return to the picklist screen after a predetermined period of time, or when the forklift 310 is moved. In an alternative embodiment, the display screen 400 is a touch screen, and the operator can access information by touching the desired item, or pressing the desired function.

The display screen 400 is also configured to identify when an item is placed, on the pallet 330 that is not on the picklist 413. If an item not on the picklist 413 is placed on the pallet 330, the RF ID for the item transmits data stored on the RF tag to the forklift 310. The data on the RF ID is then displayed to the operator on the display screen 400 in the picklist 413. However, to distinguish this item from other items on the picklist 413, the display properties of the extra item are visually different from the correct items. This difference in display can be through colour such as red, or through the use of bolding. However, other methods and combinations can be used to identify extra items on the pallet 330. Further, if too many of an item 370 are placed on the pallet 330, the display screen 400 can indicate the extra items on the screen 400 by changing the display properties for the correct item as is done when an extra item is placed on the pallet 330, or the display screen 400 can create a new entry in the picklist 413 for the added item, and treat the additional item as an extra item.

When an additional item is added, the quantity area 415 of the display screen will show 0, as no items of this type were required. In the amount area 416 the number of the item present is displayed, i.e. 1 if one item is present. In the quantity remaining area 417 the display screen 400 indicates to the user the number of that particular item that are to be removed, i.e. −1 if there is one extra item. The ability to identify extra items or incorrect totals of items 370 on a pallet inhibits persons in the warehouse 200 from changing, intentionally or unintentionally, the orders or from mispacking pallets. Further, this feature helps ensure that orders are packed and filled properly.

Figure 5A:
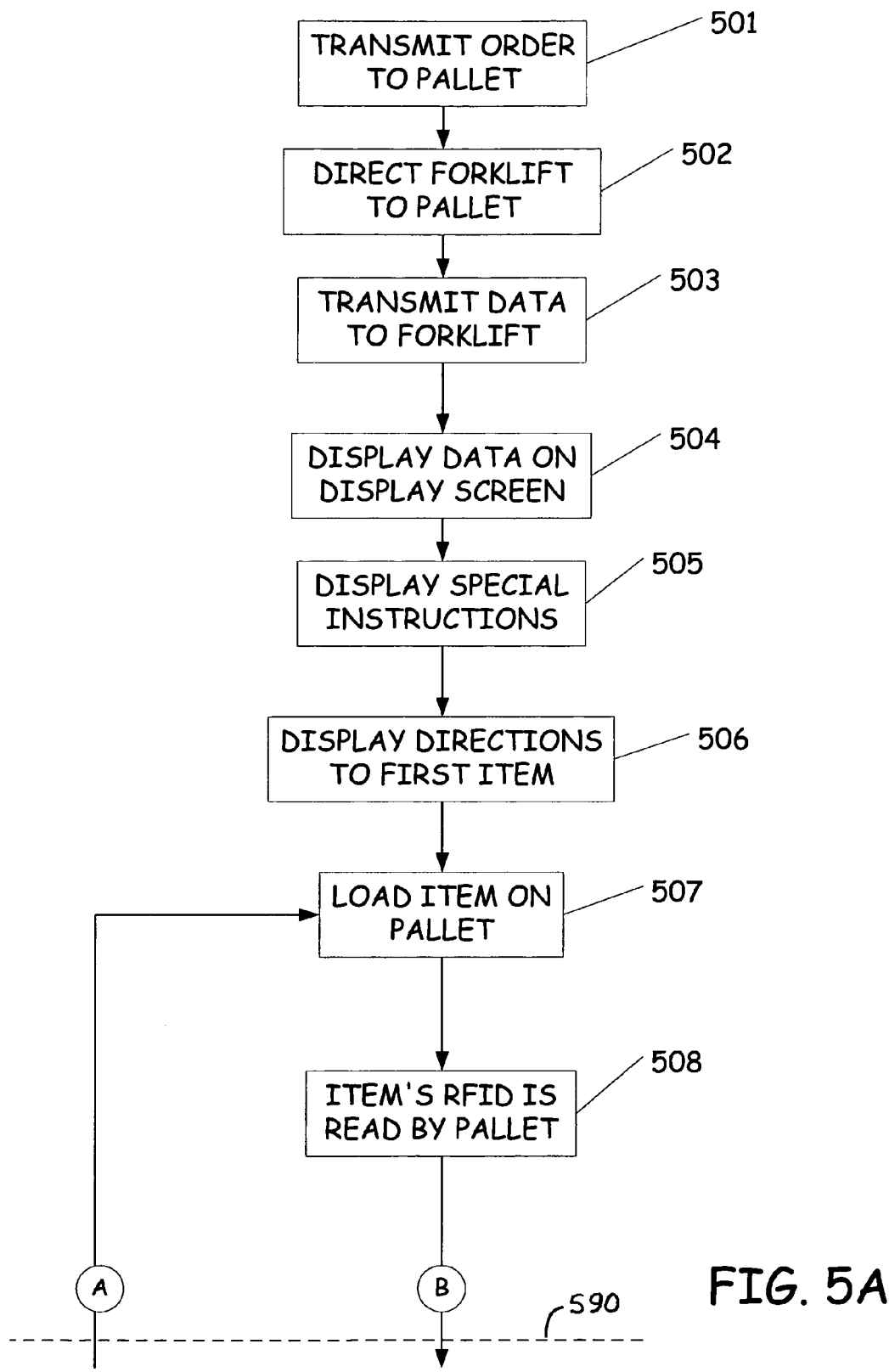
FIGS. 5A and 5B are a flow diagram illustrating the steps executed when filling an order.
Figure 5B:
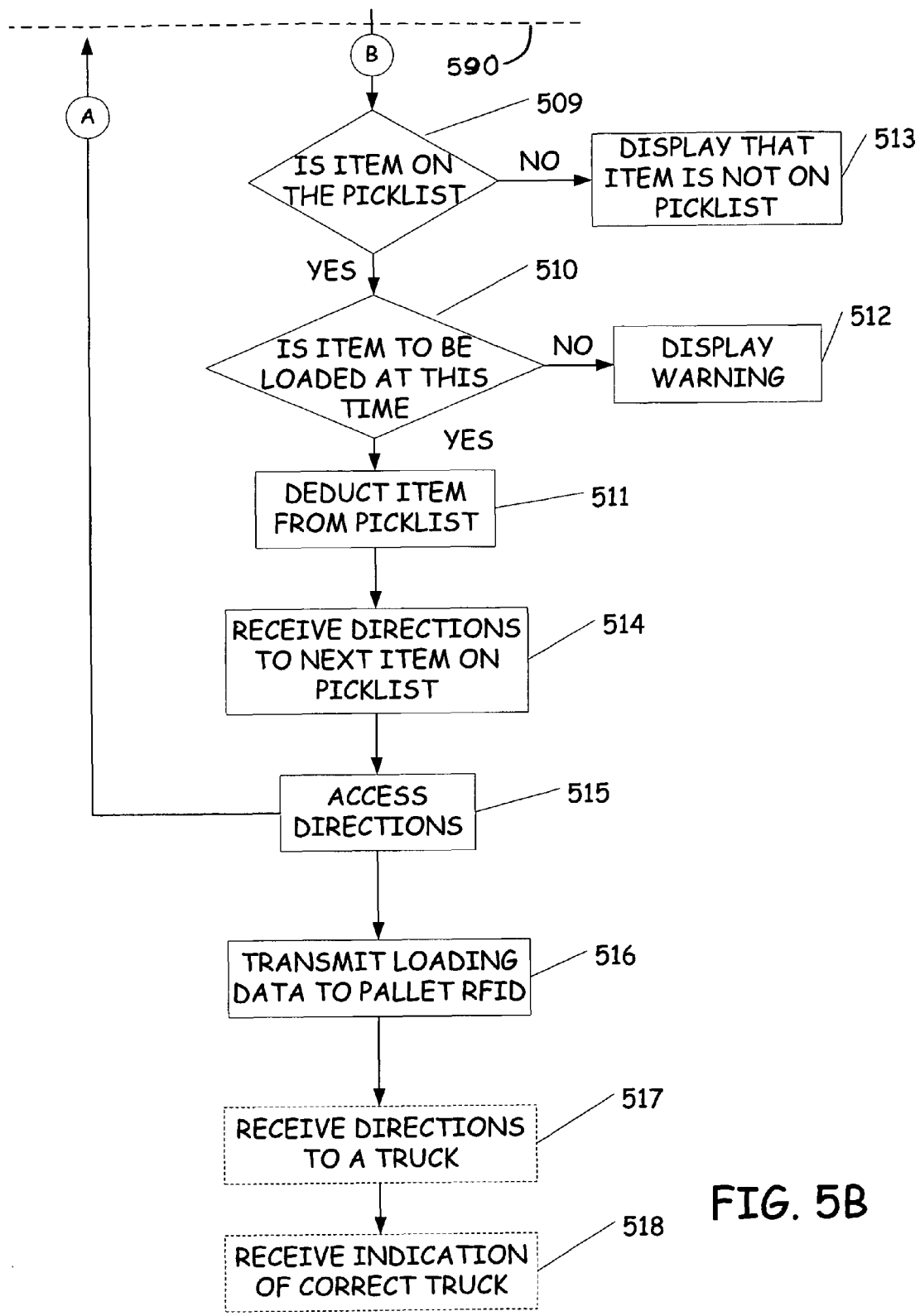

FIGS. 5A & 5B taken together are a flow diagram illustrating the steps executed when filling a picklist 413 in a warehouse 200 according to one embodiment of the present invention. illustrating FIGS. 5A & 5B are best understood when joined together along dashed line 590 that appears in both FIGS. 5A and 5B. Lines of flow that extend between FIGS. 5A & 5B are further identified by transfer bubbles A and B which appear in both FIGS. 5A & 5B.

First the contents of an order are transmitted from the master computer 320 to the pallet 330. The transmission of the order is executed via the RF transmitters 380 located throughout the warehouse 200. The master computer system 320 can determine which pallet 230 in the warehouse is best suited for the specific load in question. Once the correct pallet 330 is selected the order is transmitted to the pallet 330. The transmission of the order to a specific pallet is illustrated at 501 of FIG. 5A.

Once the order is transmitted to the pallet 330, the pallet 330 is ready to be loaded, and waits to be picked up by a forklift 210. In one embodiment of the present invention, if the pallet 330 is not picked up by a forklift 210 within a predetermined period of time, the master computer system 320 can direct a specific forklift 210 to pick up the pallet. The direction of a forklift 210 to a specific pallet is illustrated at block 502 of FIG. 5A. These instructions appear on the display device 400 forklift 210.

When the forklift 210 reaches the specific pallet 330 and loads the pallet 330 on the tines, the RF reader in the forklift 210 communicates with the RF tag on the pallet 330. During this communication the order information and pallet number are transmitted to the forklift 210. The transmission of the data to the forklift 210 is illustrated at block 503 of FIG. 5A. Once the data is received by the forklift 210, the data is displayed to the operator of the forklift as the picklist 413 on display screen 400. The displaying of the data on the screen is illustrated at block 504 of FIG. 5A.

Once the data is displayed on the screen 400, the operator can view the items in the order that they are to be loaded on the pallet 330. At this time any special loading instructions are displayed to the operator in area 440 of display device 400. These instructions can include which items are to be loaded first, or if any items must be loaded in a specific section of the pallet 330. The display of any special instructions is illustrated at block 505 of FIG. 5A. Further the instructions can include directions, directing the operator of the forklift 210 to a specific location in the warehouse 200 to pick a specific item. The display of directions to the operator is illustrated at block 506 of FIG. 5.

Once the operator has arrived at the location of the item to be loaded on the pallet 330, the operator loads the item onto the pallet 330. At this time the order management system 300 detects that the item has left the shelf 220 or storage area, and makes a note in the system that the item has been moved from its current location. This is illustrated at block 507 of FIG. 5A. Next, the operator places the item on the pallet 330. The item's RF ID is read by both the pallet 330 and the forklift 210, through their associated RF readers. This is illustrated at block 508 of FIG. 5A.

Next, the system on the forklift 210 determines whether the item placed on the pallet 330 is an item on the picklist 413. This is illustrated at block 509 of FIG. 5. If the item is on the picklist 413, the order management system 300 then checks to see if the item can be loaded on the pallet at this time (e.g. is it to be loaded first or last, etc). This is illustrated at block 510. If the item can be loaded on the pallet at this time the system deducts this item from the picklist 415 and changes the display screen 400 to indicate the new status of the pallet 350. This is illustrated at block 511. If the item cannot be loaded on the pallet at this time, an indication on display screen 400 is provided at block 512. However, other techniques for indicating that the item was incorrectly loaded can be provided, such as an audible signal.

If the item is not on the picklist 413 the system provides an indication that the item is not on the picklist 413. This is illustrated at block 513. In an alternative embodiment, the system can prevent the forklift 210 from moving if an item not on the picklist 413 is placed on the pallet. When this feature is included on the system 300 a manual override function can be provided to allow the forklift 210 to move, but a notation is made in the system that the override feature was used so that it is possible to later identify why the item was loaded if any problems occurred.

Once the item has been loaded on the pallet 330, and the appropriate change in status has been noted on the system, the display device 400 directs the operator to the next item on the picklist 413. This is illustrated at block 514. If the operator does not know where the next item in the list is located, the operator can access the location of the item through the buttons 441-445 on the display device 400 to highlight the item, and access more details on the item. Once highlighted, the operator can ask for directions to the next item. In an alternative embodiment, the system will automatically provide directions to the next item on the picklist 413. The directions are displayed to the user in the location area section 420 of the display screen 400. This is illustrated at block 515 of FIG. 5B. When the user reaches the new item, steps 507 through 514 are repeated until all items 370 on the picklist 413 are loaded on the pallet 330.

Once all of the items 370 have been loaded on the pallet 330 the display screen 400 directs the forklift 210 to a packaging area 250 or other location in the warehouse 200. The forklift operator then drops off the pallet 330 at this location. At this time the RF tag 332 for the pallet receives information associated with the forklift and stores this information on the RF tag 332. This information can include the operator, the forklift, time of day, or any other information that is required by the system. This process is illustrated by block 516 of FIG. 5B. Once the forklift 210 has finished with pallet 330 it leaves the packaging area and picks another pallet and proceeds to load that pallet.

In alternative embodiments, the forklift operator may remain with the pallet 330 in the packaging area 250. In this embodiment, once the packaging is complete, the display screen 400 will provide the operator with instructions as to a specific truck 262 onto which the pallet 330 is to be loaded. The operator will then take the pallet 330 to the truck 262. An RF receiver 266 located at the truck 262 reads the RF tag of the pallet and records the pallet as being loaded on the truck. If the pallet 330 is loaded on the wrong truck then the display screen 400 informs the operator that the pallet is on the wrong truck. These steps are illustrated in phantom by blocks 517 and 518 of FIG. 5.

While the present invention has been described above with reference to a warehouse and a pallet loading scenario, the principles discussed above can be applied in other situations.

Figure 6A:
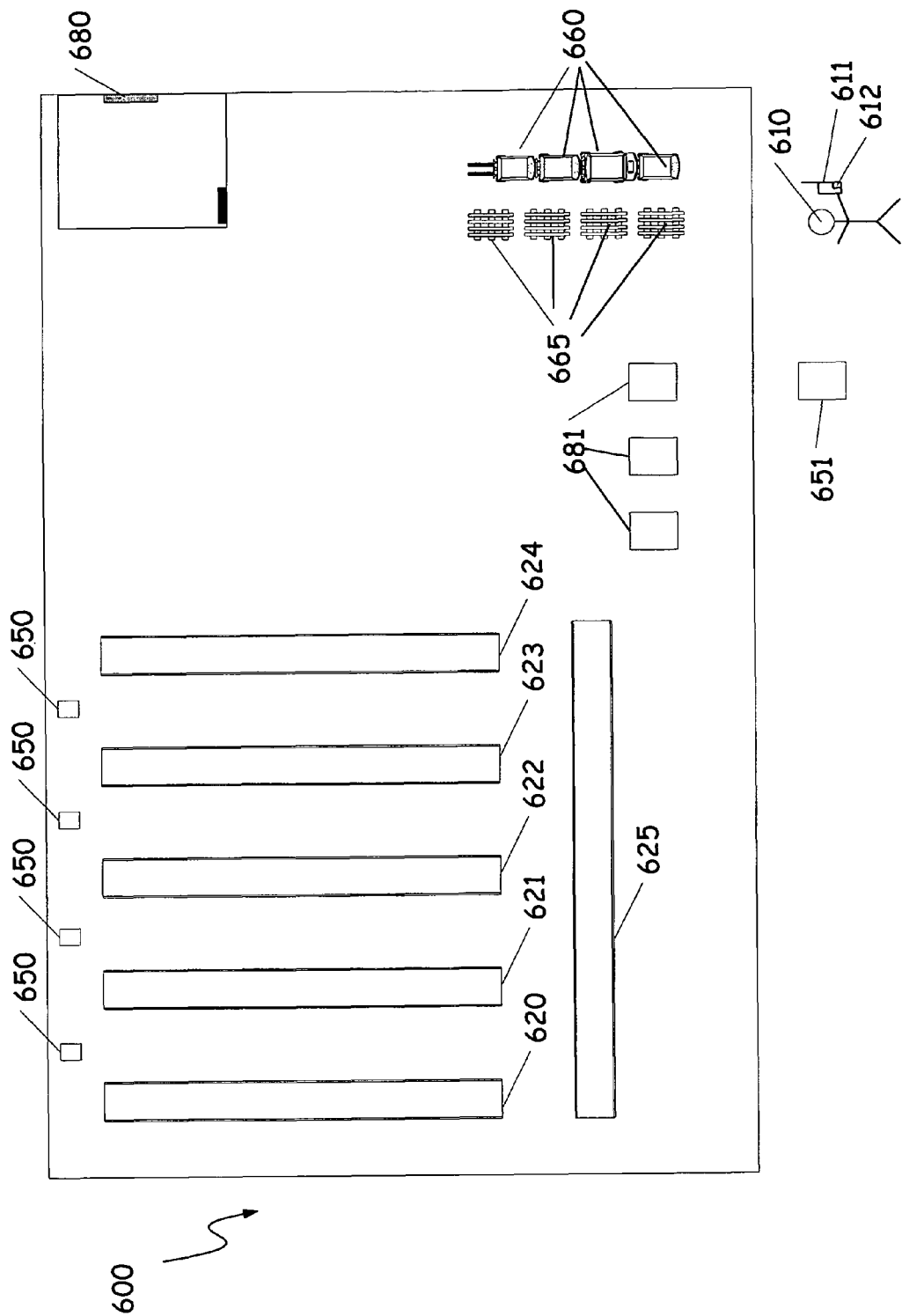
FIG. 6A is an overview diagram of a grocery store in which the present invention can be used.

FIG. 6A illustrates an alternative embodiment of the present invention as envisioned in a grocery store setting.

FIG. 6A is diagrammatic representation of the present invention in a grocery store 600 according to one embodiment of the present invention. Grocery store 600 includes a shopper 610, a plurality of shelves 620-629, a plurality of RF readers 650, a plurality of shopping carts 660, a plurality of hand baskets 665, and a plurality of checkout registers 681.

Shopper 610 is a person who has come to the grocery store 600 to shop for groceries. Typically shoppers come to a grocery store with a shopping list or other notes as to the items they desire to purchase. Often times the shopper 610 also has children with them, and children can often put items in the shopper's cart without the shopper's knowledge. However, items are often also placed in the cart by persons other than the shopper's children. Shopper 610 has a cell phone 611 or other handheld device that is programmed with a shopping list 612. The shopping list 612 is generated by the shopper 610 prior to entering the grocery store 600. While shopper 610 has a cell phone 611, those skilled in the art will readily recognize that cell phone 611 can be replaced with any other portable electronic device, such as a personal digital assistant (PDA). Additionally, cell phone 611 can be configured to communicate via an RF link.

Figure 6B:
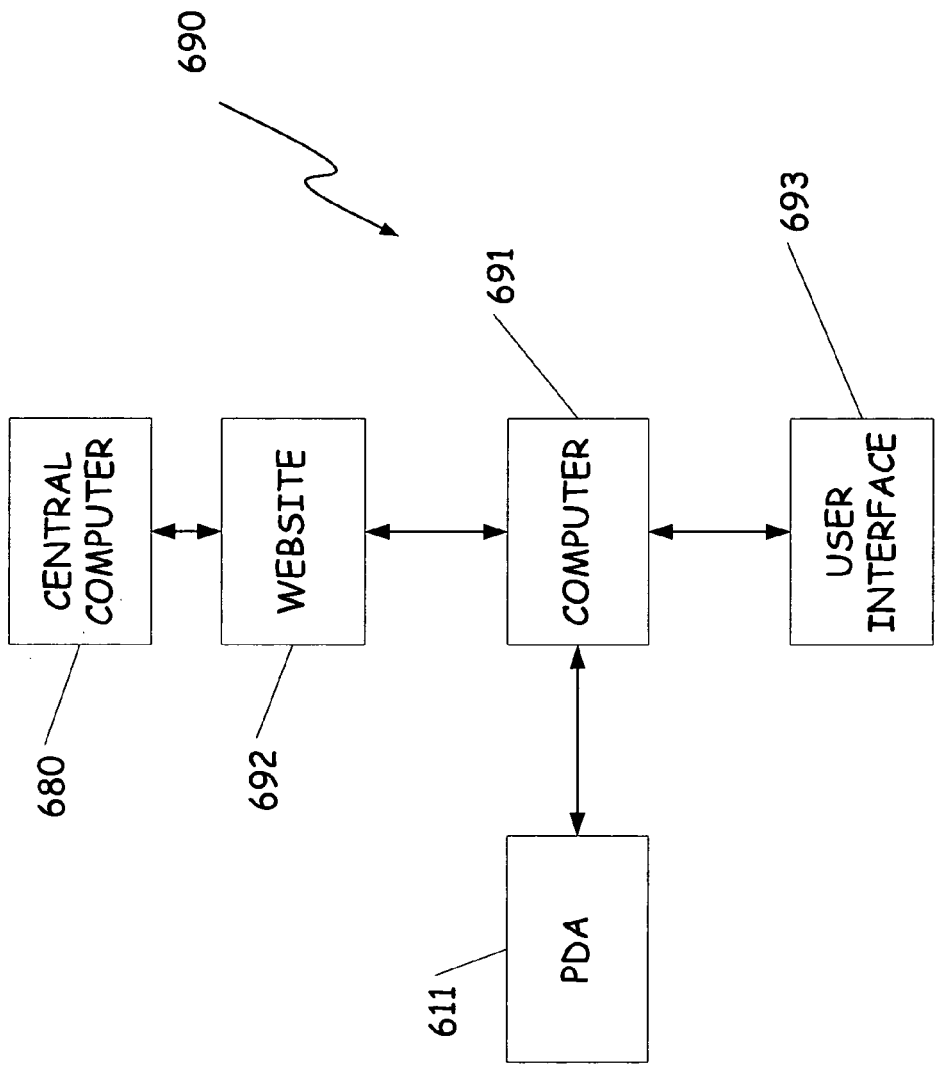
FIG. 6B is a block diagram illustrating the components used to generate a shopping list.

FIG. 6B illustrates a computer system 690 used by a shopper 610 to generate the picklist 612 according to one embodiment of the present invention. System 690 is a home computer system connected to a global network such as the Internet. In the embodiment illustrated in FIG. 6B, computer 691 is connected to a web server 692 at the grocery store 600 via the Internet or other connection. Website 692 contains a list of products for sale at the grocery store 600, and includes a feature for the shopper 610 to generate a shopping list 612 for a trip to the store. Computer 691 is also connected to the cell phone 611 or other portable electronic device through any known method of connection, such as RF, infrared (IR), Bluetooth, universal serial bus (USB), serial, etc.

The shopper 610 accesses the feature on the website 692 to generate a shopping list for the trip by entering or selecting the items and number desired. The website 692 can display the items in any manner that is appropriate to the store. The shopper 610 can load the desired items into a virtual shopping cart, check the items from a list, or select the items from a series of pull down menus. Items on the website can be grouped by product type, cost or any other method. When the shopper 610 has finished creating the shopping list, the list is then downloaded via the connection to the cell phone 611. The shopper 610 can then review the items on the shopping list 612 through the user interface on the cell phone 611, or through a user interface 693 on the computer system 690.

In one embodiment when the shopper 610 arrives at the grocery store 600, an RF reader 651 detects the shopper's cell phone 611 and communicates with the cell phone 611. The RF reader 651 receives from the cell phone 611 the shopping list 612 generated by the shopper 610. This shopping list 612 is transmitted to a central computer 680, which processes the list, and determines what size conveyance is needed to fill the list 612. The central computer 680 transmits to the RF reader 651, and on to the cell phone 611, instructions to the shopper indicating if the shopper needs a cart or a basket. If the number of items is large enough the shopper will be directed to a shopping cart 660.

Figure 6C:
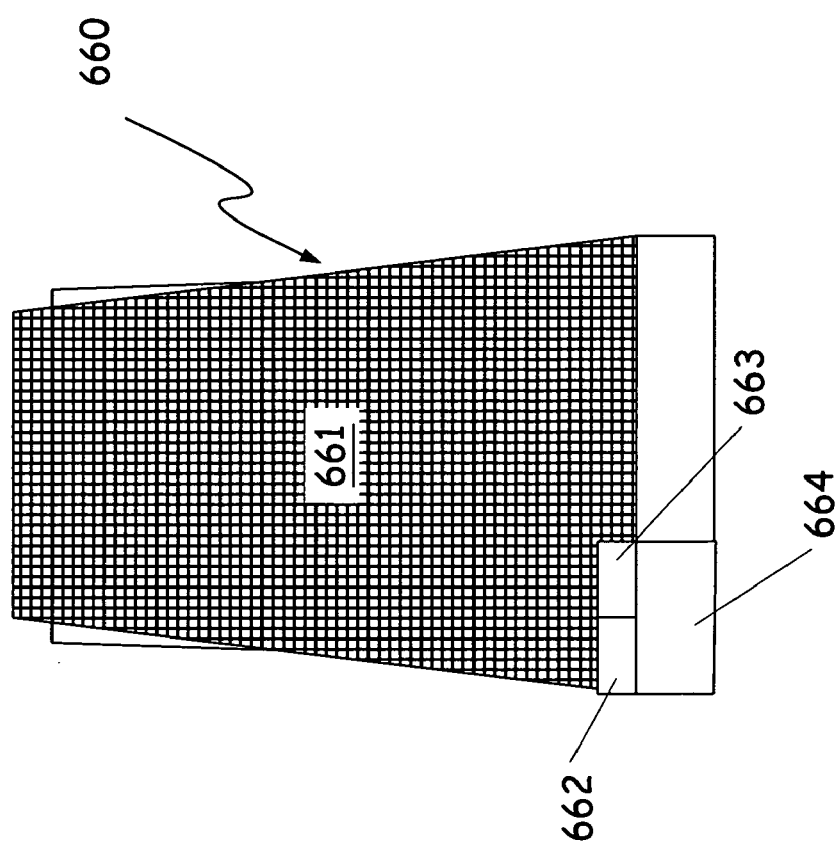
FIG. 6C is a diagrammatic illustration of a shopping cart with which the present invention can be used.

Shopping cart 660 is in one embodiment a common shopping cart typically found in retail establishments. An example of a shopping cart is illustrated at FIG. 6C. Shopping cart 660 includes a product holding section 661, an RF reader and tag 662, a portable electronic interface 663, and a display screen 664. Hand basket 665 includes a product holding section, an RF reader and tag, a portable electronic interface, and a display screen. Both shopping cart 660 and hand basket 665 operate in the same manner.

When the shopper 610 selects a shopping cart 660 or a hand basket 665, the shopper places their cell phone 611 in or near the portable electronic interface 663. Portable electronic interface 663 is an interface that is configured to extract the data related to the shopping list 612 from the cell phone 611 or other personal portable electronic device. In one embodiment portable electronic interface 663 is an inferred receiver that receives information from the cell phone 611. In other embodiments the personal portable electronic interface 663 is configured to transmit and receive information between the cell phone and the shopping cart. However, other arrangements for communicating between the cell phone 611 and the personal portable electronic interface 663 can be used. The cell phone 611 transmits the shopping list 612 to the shopping cart 660.

Once the shopping list 612 is received at the shopping cart, the list is processed and displayed on the display screen 664. An example of a display screen is illustrated at FIG. 7.

FIG. 7 illustrates a display screen 700 that is similar to display screen 664. Display screen 700 includes a shopping list order section 710, an information section 720, and a total price section 730. However other sections can be added to the display screen 700. Display screen 700 includes any necessary components needed to read and display the shopping list 612

Shopping list section 710 displays the shopper's shopping list. Items on the shopping list 612 are displayed on a separate line. The item's name is displayed in column 715, the quantity of the item desired is displayed in column 716 and the number of the item present is displayed in column 717. The items are ordered, in one embodiment, according to where the items are located in the store. In this embodiment, items that are closer to the front of the store are listed first, and items towards the back of the store are listed last. However, other arrangements of the items can be used, such as by sections of the store, by aisle, or by a desired travel path through the store 600. For instance, shoppers that have beer on their list may be directed in a path (based on the order if items listed, or otherwise) that passes the pretzels. The display screen 700 can also scroll the list automatically as the shopper moves through the store 600.

The items in the grocery store 600 are identified with an RF tag, that includes information related to the specific item. The RF tag for an item can be preinstalled on the item at the manufacturer, or it can be added when the item is stocked by the store 600. The RF tags also provide the store 600 with up-to-date information related to the inventory, and can also be used to track shoppers' habits. As the shopper 610 moves through the store 600, and places items in the cart 660, the RF reader 662 on the shopping cart logs the item into the carts "inventory." Once the item is in the cart 660, the order management system removes the item from the shopping list. The shopper will notice that the item is no longer on the shopping list 612 displayed on the display screen 664. If the shopper had more than one of the item on the shopping list, such as 3 cans of peas, the present invention will not remove the item from the list, but will deduct the number of the item present from the total needed. In an alternative embodiment items that are present on the list are crossed off, using strikeout or other features, similar to the method commonly used by shoppers with a paper shopping list as illustrated at line 712.

If an item is placed in the cart that is not on the list 612, the cart 660 will identify the item via its RF tag, and display the item on the display screen 664. Referring back to FIG. 7, an item in the cart that is not originally on the shopping list 612 is highlighted in such a way as that the shopper can readily identify the item in question. In one embodiment the item is highlighted in bold on the display screen as illustrated at line 770, and a note is displayed in area 720. However, other methods of indicating to the shopper that an extra item was placed in the cart can be used.

When the item is placed in the cart, the shopper can allow the item to remain in the cart by selecting an accept button 772, or other selection device on the display screen. If the shopper accepts the item then the highlight for the item is removed, and the item is treated like any other item on the shopping list. If the shopper rejects the item by selecting the reject button 773, the item remains bolded on the display screen until the item is removed. Once the item is removed from the cart, the indication of the extra item is removed from the display screen. However, other methods can be used.

During the course of shopping the shopper may select an item on the list and place it in the cart. At the time the product is placed in the cart the present invention can indicate to the shopper information about that item or related items in the information area 750. Illustratively, if the shopper placed macaroni and cheese in the cart 660 the information area 750 could display information related to another brand of macaroni and cheese. For example the display could read, "You have selected ABC Macaroni and Cheese for $0.99. However, XYZ Mac and Cheese is on sale this week for $0.19." In another example the shopper 610 placed tortilla chips in the cart 660, but did not have salsa on the list. In this example the screen could display "You have selected Tortilla Chips, do you want salsa with that?" This feature acts as a reminder for the shopper 610 in the event they forgot a related item from their shopping list.

Information area 750 can also be used to provide advertising information to the shopper 610. This information can be about certain products in the store, or can be provided by outside organizations attempting to reach the shopper 610.

When the shopper has gathered all of the items on the shopping list 612 the information area can direct the shopper to a specific checkout lane 681 in the store 600. If there are any remaining extra items in the cart, the display screen 664 will only show those items, and ask the shopper 610 to either remove the items or accept the items. Once the shopper 610 arrives at the checkout lane 681, the shopper can check out in a conventional manner, or the RF tag 662 on the shopping cart can transmit to the checkout stand the items in the cart 660. Based on the items in the cart 660, the checkout lane 681 can generate a receipt for the purchase without having to scan the items. In another embodiment, the shopper can pre-register a credit or debit card when creating a shopping list, and simply walk out the door with the goods once the items have been transmitted to the store's computers and totaled.

The present invention can be used in other areas as well as the scenarios disclosed above. For example, the RF tags of the present invention can be used to track livestock, and a picklist can be generated for specific animals in the herd to be loaded on a trailer, or placed in a specific paddock. Further, the RF tag can be swallowed by the animal, and recovered later if the rancher desires to know the results of a new feed, by analyzing the fecal matter of the animal or group of animals that were given the new feed.

Although the present invention has been described with reference to particular embodiments, workers skilled in the art will recognize that changes may be made in form and detail without departing from the spirit and scope of the invention.

What is claimed is:

1. A method of filling an order using a product moving device that engages and supports a pallet in a store, comprising:
   receiving a list transmitted to a first device coupled to the pallet, the list including a plurality of items that are representative of the order;
   transmitting the list from the first device to a second device on the product moving device;
   displaying the list to an operator on a display device on the product moving device, the display of the list including, for each of the plurality of items, a quantity of the item needed for the order, a quantity of the item currently present on the pallet, and a quantity of the item remaining to be placed on the pallet to complete the order;
   placing one of the plurality of items on the list on the pallet;
   detecting the one of the plurality of items placed on the pallet by receiving a signal from a tag on the item and identifying the item based on the received signal;
   reflecting detection of the one of the plurality of items on the list displayed on the display device, the detection being reflected by adding the number of the one of the plurality of items detected to the quantity of the item currently present on the pallet, and by deducting the number of the one of the plurality of items detected from the quantity of the item remaining to be placed on the pallet to complete the order;
   electronically displaying, at the product moving device, a route within the store for the operator to travel with the product moving device to obtain all remaining items on the list;
   adding information about the one of the plurality of items to an RF tag on the pallet, the information including a name of the item, a description of the item, an item ID, and a weight of the item;
   adding information to the tag on the one of the plurality of items, the information including a date and a time the item was added to the pallet;
   providing delivery and transport information to the RF tag on the pallet, the information including a delivery address, a freight company, and interim transit points;
   querying the operator about additional items not on the list;
   preventing the moving device from moving upon an item not on the list being placed on the pallet;
   providing a manual override function to allow the moving device to move; and
   adding a notation that the manual override function was utilized.

2. The method of claim 1 wherein the quantities of the items needed for the order, the quantities of the items currently present on the pallet, and the quantities of the items remaining to be placed on the pallet are arranged such that each type of information is in a separate column, wherein above each of the columns is a label field that identifies the type of information included in the associated column, and wherein an area above the label fields includes a pallet identification field and an order identification field, the pallet identification field displaying a unique pallet identification number for each pallet, and the order identification field displaying a unique order identification number for each order.

3. The method of claim 1 wherein displaying the list further comprising:
   displaying information for each of the plurality of items on separate lines of the display device;
   displaying different types of information for each of the plurality of items in separate columns within each of lines; and
   wherein one of the separate columns includes location information for each of the plurality of items.

4. The method of claim 1 further comprising:
   storing information associated with the product moving device to the RF tag on the pallet, the information including an indication of a forklift, the operator, and a time of day.

5. The method of claim 2 further comprising:
   receiving an indication of a next item in the list to load on the product moving device;
   displaying on the display device the next item on the list; and
   displaying on the display device a map, the map including the locations of the next item on the list and the product moving device; and
   wherein the next item on the list and the map are displayed in an area of the display device that is positioned below each of the quantities of the items needed for the order, the quantities of the items currently present on the pallet, and the quantities of the items reaming to be placed on the pallet.

6. The method of claim 5 further comprising:
   displaying on the map locations of other product moving devices and blocked aisles, the locations of the other product moving devices and the blocked aisles being communicated to the product moving device from a master computer system that receives information indicative of the other product moving devices and of the blocked aisles utilizing RFID readers located within the store.

7. The method of claim 6 further comprising:
   displaying on the map a routing to the next item, the routine being displayed utilizing a line that indicates a path from the product moving device to the next item.

8. The method of claim 1 further comprising:
   receiving at the display device an indication of specific handling instructions for the plurality of items, the specific handling instructions including an order in which to load the plurality of items onto the pallet.

9. The method of claim 1 further comprising:
   adding information related to storage of the one of the plurality of items to the tag on the one of the plurality of items, the storage information including shock information; and
   adding information related to delivery and transport of the pallet to the tag on the pallet, the delivery and transport information including a delivery address, a name of a freight company, and interim transit points.

10. The method of claim 1 further comprising:
    determining if a second detected item is on the list;
    providing an indication to the operator if the second detected item is not on the list;
    adding the second detected item to the list on the display device; and
    displaying the second detected item in a format different from the plurality of items that were originally on the list.

11. The method of claim 10 wherein the second detected item is displayed in bold.

12. The method of claim 10 wherein the second detected item is displayed in a different color than the plurality of items.

13. The method of claim 1 further comprising:
    accessing additional data about the one of the plurality of items on the list through the display device; and
    returning to the list upon the product moving device moving.

14. The method of claim 13 wherein accessing the additional data further comprising:
touching a representation of the one of the plurality of items on a touch screen.

15. The method of claim 1 wherein when a last item on the list is placed on the product moving device, the method further comprising:
instructing the operator of the product moving device to take the pallet to a specific truck;
reading the RF tag on the pallet with an RF reader on the specific truck; and
recording the pallet as being loaded at the specific truck.

16. An order filling system comprising:
a first computer system;
a picklist containing a list of desired items to fill an order;
a product moving machine having a first reader disposed thereon, connected to the first computer system;
a pallet having a tag and a second reader disposed thereon, the tag readable by the first reader on the product moving machine, the tag storing a pallet identification and data related to the order including the picklist in a form readable by the reader, the pallet identification being associated with the order in the first computer system and wherein the second reader is configured to read data from an item tag disposed on each of the items that is placed on the pallet;
a display device connected to the product moving machine configured to display the picklist;
wherein the picklist is generated at the first computer system and transmitted to the first reader on the product moving machine;
wherein the pallet tag is updated to include information from the item tag of each of the items placed on the pallet; and
wherein the picklist includes:
an order information area having an order number area, a pallet ID number area, and a picklist area, the order number area displaying an order label and a number that identifies the order, the pallet ID number area displaying an ID label and a number that identifies the pallet, and the picklist area including information about the order arranged in a plurality of rows and columns, each of the columns corresponding to a different type of information, a top row of each column having a label that identifies the type of information included in the rows beneath the top row, each of the rows beneath the top row corresponding to one type of item included within the order, one of the columns including item description information, a second one of the columns including quantity of item desired information, a third one of the columns including quantity of item present on the pallet information, a fourth one of the columns including quantity of item remaining to complete the order information, and a fifth one of the columns including item location information that identifies, for each of the items in the list, a location of the item within a warehouse;
a location area having a map of the warehouse, the map showing the location of the product moving machine within the warehouse;
an information area having instructions, the instructions indicating a specific arrangement required for placement of items on the pallet;
a user interface area that allows an operator to view more details about a specific item on the order and to view other options that are not shown on the display device, the user interface area having a plurality of buttons that can be activated by the operator, the user interface further having, above the plurality of buttons, a display portion that provides information relating to a response that is executed by the system when the corresponding button is pressed; and
wherein the specific arrangement includes arranging items on the pallet to obtain a correct weight balance.

17. The order filling system of claim 16 wherein the product moving machine is a forklift, wherein the pallet tag is placed on an inside portion of a support on the pallet, wherein the order number area and the pallet ID number area are positioned above the picklist area on the display device, wherein the picklist area is positioned above the location and the information areas, and wherein the location and the information areas are positioned above the user interface area.

18. The order filling system of claim 16 wherein the reader of the product moving machine is configured to receive information from the tag on the pallet as items are placed on the pallet, wherein the pallet tag and the second reader are integrated into a single unit, and wherein the product moving machine is prevented from moving upon an item not included on the picklist being placed on the pallet, the product moving machine further including a manual override function that allows the product moving machine to move once it has been prevented front moving, and wherein a notation is made upon the manual override function being used.

19. The order filling system of claim 16 wherein the specific arrangement includes placing heavier items on the bottom of the pallet.

20. The order filling system of claim 16 wherein in response to an item being placed on the pallet, the display device is configured to change the item's quantity present and quantity remaining.

21. The order filling system of claim 16 wherein the plurality of buttons include an up button, a down button, and a details button, the up and the down buttons enabling a cursor to move between items in the picklist, and the details button enabling the operator to view details about a selected item.

22. The order filling system of claim 21 further comprising a button associated with the picklist that enables the operator to return to the screen displaying the picklist.

23. The order filling system of claim 16 wherein the display device is configured to provide an audible alert if an item not on the picklist is placed on the pallet.

24. The order filling system of claim 16 wherein the tags and the readers operate using radio frequency (RF), the RF selected from the group consisting of 125 kHz, 13.56 MHz, and 800-900 MHz.

* * * * *